Patented Sept. 14, 1937

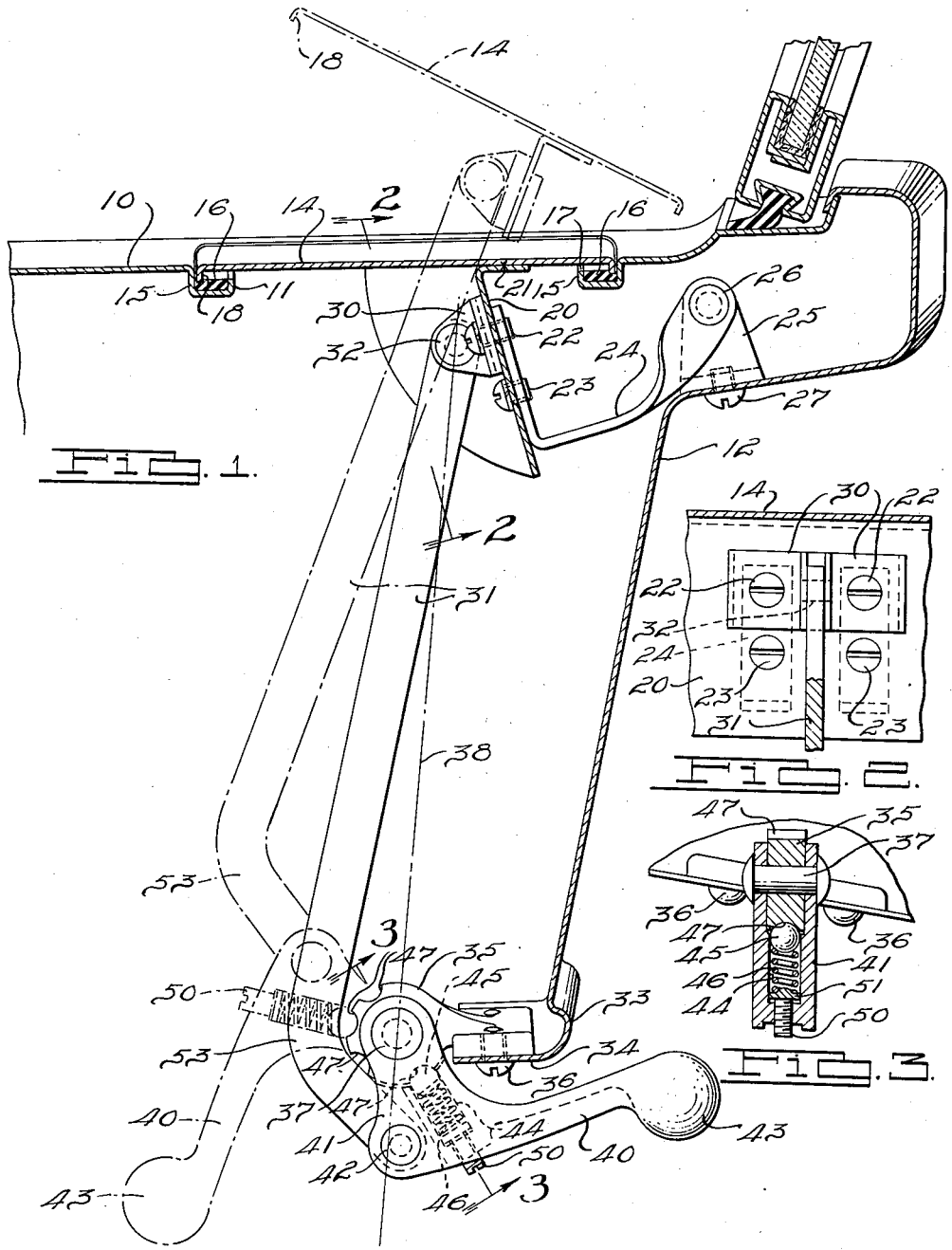

2,093,036

UNITED STATES PATENT OFFICE 2,093,036

VENTILATOR CONTROL MECHANISM

John W. Dickason, Detroit, Mich., assignor to Chrysler Corporation, Detroit, Mich., a corporation of Delaware Application November 17, 1933, Serial No. 698,485

5 Claims. (Cl. 98—2)

This invention relates to cowl ventilators for motor vehicles.

One of the objects of the invention is to provide a simple and efficient closing means for an opening in a vehicle body.

Another object of the invention is to improve the seal between a closure member and an opening in a vehicle body.

Another object is to prevent rattling of parts of a cowl ventilator mechanism for all positions of the closure member.

Another object of the invention is to provide an operating means for a cowl ventilator which automatically locks the closure member in closed position.

Another object of the invention is to provide a cowl ventilator operating mechanism which compresses a closure member against a sealing element when the closure member is locked in closed position.

Other objects and advantages will become apparent from the following description and appended claims.

For the purpose of illustrating the genus of the invention, a typical concrete embodiment is shown in the accompanying drawing, in which:

Figure 1 is a vertical section taken slightly to one side of the centerline of the cowl of a motor vehicle body and showing a ventilator mechanism associated therewith, and Figs. 2 and 3 are detail sections taken on the lines 2—2 and 3—3 of Fig. 1.

Referring to the drawing, 10 represents the cowl panel of the body of a motor vehicle, which panel is provided with a ventilating opening 11 therein. A cowl or instrument board 12 extends downwardly from and is supported by a cowl panel 10. A closure member or door 14 is adapted to close the opening 11. The operating and hinge mechanism for the closure member 14 is preferably assembled on a support fixed relative to and depending from the cowl panel. The cowl or instrument board 12 affords a convenient support for the hinging and operating mechanism for the closure member and this assembly is attached as a unit to the cowl panel 10, after which the closure member 14 may be connected to the operating mechanism therefor.

The margin of the cowl panel 10 bordering the opening 11 is shaped to provide a channel or trough 15 opening upwardly of the cowl panel and adapted to receive a sealing gasket 16. The closure member 14 is provided with a downwardly extending flange 18 about the outer margin thereof adapted to closely fit the outer margins of the trough 15 and of a depth such that when the closure member 14 is in shunt position slightly compressing the sealing gasket 16 the upper surface of the closure member lies flush with the cowl panel 10. The gasket 16 is preferably of rubber or other waterproof and resilient material and completely fills the trough 15 up to a point level with the inner margin 17 of the trough so that no provision need be made for draining water from the latter.

The closure member 14 is provided with a depending bracket 20, preferably secured to the under face of the closure member by welding as indicated at 21, and connected by means of screws 22 and 23 to a bent hinge arm, substantially U shaped in the present instance to afford clearance between the hinge arm 24 and the channel or trough 15. The hinge arm 24 is pivoted to a bracket 25 by means of a suitable pivot pin 26, the bracket 25 being secured in fixed position relative to the cowl panel, as for example, by securing the same to the instrument or cowl board 12 by means of screws 27.

The screws 22 not only connect the depending bracket 20 and hinge arm 24 but also serve to secure a pair of brackets 30 to the depending bracket 20 by which a connecting link 31 is connected to the closure member 14 by means of a pivot pin 32. The bottom edge of the instrument board 12 is provided with a beam portion 33 and an inwardly directed flange 34. A pivot bracket 35 is secured to the flange 34 by means of screws 36. The portion of the bracket 35 extending outwardly from the flange 34 is of substantially cylindrical formation and provides a bearing for a pivot pin 37 by which an L-shaped or bell crank like operating lever 40 is connected to the bracket 35. The shorter leg 41 of the operating lever 40 is bifurcated throughout its length to receive and be pivotally connected to the bracket 35 at the outer terminal thereof and to receive and be pivotally connected to the other end of the connecting link 31 at the juncture of the two legs of the operating lever. The connecting link 31 is pivotally connected to the operating lever 40 by a pivot pin 42. The longer leg of the operating lever 40 is provided with a ball 43 or other suitable handle portion by which the operating lever may be manually actuated. The operating lever 40 is provided with a cylindrical recess 44 directed radially with respect to the pivot pin 37 and adapted to receive a ball detent 45 and spring 46, the ball 45 cooperating with suitable recesses 47 provided in the periphery of the cylindrical portion of the bracket 35. An adjusting screw 50 and washer 51 may be provided for adjusting the tension of the spring 46.

The connecting link 31 is curved or angled as indicated at 53 so that when the closure member 14 is in shut position the pivot pin 42 will be slightly beyond an extended centerline 38 through the axes of the pivot pins 37 and 32 and on the opposite side of the centerline 38 from the major portion of the length of the connecting link 31. With the closure member of the ventilator in closed position, the link 31 contacts the cylindrical portion of the bracket 35 so that any upward force upon the closure member or upon the pivot 32 will only tend to tighten the contact between the connecting link 31 and the periphery of the cylindrical portion of bracket 35 so that when the ventilator is in shut position it cannot be opened from outside the vehicle body. With the cowl ventilator in shut position, it can be opened only by rotating the operating lever 40 in a clockwise direction as viewed in Fig. 1 about the pivot 37 which serves to swing the pivot 42 beyond the centerline of the pivots 37 and 32 to unlock the closure member, and then continued rotation of the operating lever 40 swings the pivot pin 42 upwardly and around the pivot pin 37 as a center to swing the pivot pin 32 about the pivot pin 26 as a center, thus moving the closure member 14 to the open position desired. The ball detent 45 and spring 46 cooperate with the recesses 47 to maintain the closure member 14 and operating parts therefor in the desired position of adjustment. Optionally, recesses corresponding to the recesses 47 could be provided in the rounded periphery of the terminal end of leg 41 and a cooperating spring pressed detent could be mounted in the bracket 35 for the same purpose. When the closure member 14 is in shut position the flanges 18 slightly compress the resilient gasket 16 so as to efficiently seal the closure member against the cowl panel 10 to prevent entrance of water or air into the vehicle body.

As many changes could be made in the above construction and many apparently widely different embodiments of this invention could be effected without departing from the spirit thereof, it is intended that all matter contained in the above description or shown in the accompanying drawing shall be interpreted as illustrative and not in a limiting sense.

What is claimed is:

1. In a motor vehicle, the combination of a cowl provided with an opening therein, a support member fixed in position with respect to said cowl, a closure member pivoted at a fixed point with respect to said cowl, a bracket fixed to said support member, an operating lever pivoted to said bracket, and a link pivotally connecting said operating lever and said closure member, said link being of angular formation whereby the pivotal connection between the link and operating lever crosses a line extended through the axes of the pivotal connections between said link and closure member and between said operating lever and bracket with the link abutting the bracket to lock the closure member in shut position.

2. In a motor vehicle, the combination of a cowl provided with an opening therein, a support member fixed to said cowl, a closure member for said opening and pivoted at a fixed point with respect to said cowl, a bracket fixed to said support, an operating lever provided with a bifurcated portion enclosing a portion of said bracket and pivotally connected thereto, and a link pivotally connected at one end to said closure member and pivotally connected at its other end within the bifurcated portion of said operating lever, said link being of angular formation whereby the pivotal connection between said link and operating lever crosses the line between the pivotal connection between said link and closure member and between said operating lever and bracket with the link abutting the bracket to lock the closure member in shut position.

3. In a motor vehicle, the combination of a cowl provided with an opening therein, a support member fixed in position with respect to said cowl, a closure member for said opening pivoted at a fixed point with respect to said cowl, a bracket fixed to said support member, a substantially cylindrical portion on said bracket provided with recesses in the periphery thereof, an operating lever pivotally connected at one end to said bracket at the axis of said cylindrical portion, a link pivotally connected at one end to said closure member and at the other end to said operating lever at a point removed from the pivotal connection between the lever and bracket, a yieldably mounted detent carried by said operating lever and engageable with said recesses for holding said closure member in predetermined open positions, the end of said link which is pivotally connected to said operating lever being offset with respect to the remainder of the link, whereby the pivotal connection between the link and lever crosses the extension of a line passing through the pivotal connection between said bracket and said lever, and between said closure member and said link upon rotation of said lever to shut said closure member for locking the latter in shut position.

4. In a motor vehicle, the combination of a cowl provided with an opening therein, a support member fixed in position with respect to said cowl, a closure member pivoted at a fixed point with respect to said cowl, an operating lever handle pivotally mounted on said support, and a link having one end pivotally connected with said closure member and the other end pivotally connected with said lever handle, the axis of the pivotal connection between said link and lever handle being disposed out of alignment with a line extending through the axis of the connection between the lever handle and support and the axis of the pivotal connection between the link and closure member and located on the side of said line in the direction of the closing movement of the lever handle when the closure member is in shut position.

5. In a structure having an enclosing housing provided with an opening therein, a support member fixed in position with respect to said housing, a closure member for said opening pivotally mounted on said support, a bracket fixed to said support member, an operating lever handle pivotally mounted on said bracket, and a link having one end pivotally connected with said closure member and the other end pivotally connected with said lever handle, the axis of the pivotal connection between the link and lever handle being disposed out of alignment with a line extending through the axis of the connection between the lever handle and bracket and the axis of the pivotal connection between the link and closure member and located on the side of said line in the direction of the closing movement of the lever handle when the closure member is in shut position.

JOHN W. DICKASON.